(12) United States Patent
MacInnes et al.

(10) Patent No.: US 10,800,412 B2
(45) Date of Patent: Oct. 13, 2020

(54) SYSTEM AND METHOD FOR AUTONOMOUS CONTROL OF A PATH OF A VEHICLE

(71) Applicant: GM GLOBAL TECHNOLOGY OPERATIONS LLC, Detroit, MI (US)

(72) Inventors: Roddi L. MacInnes, Thornhill (CA); Akram M. Abdel-Rahman, Ajax (CA); Rana M. Dastgir, Toronto (CA); Paul R Williams, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 16/158,648

(22) Filed: Oct. 12, 2018

(65) Prior Publication Data

US 2020/0114912 A1 Apr. 16, 2020

(51) Int. Cl.
*B60W 30/12* (2020.01)
*B60W 40/06* (2012.01)
*G05D 1/00* (2006.01)
*G06K 9/00* (2006.01)

(52) U.S. Cl.
CPC ............ *B60W 30/12* (2013.01); *B60W 40/06* (2013.01); *G05D 1/0088* (2013.01); *G06K 9/00798* (2013.01); *G05D 2201/0213* (2013.01)

(58) Field of Classification Search
CPC .... B60W 30/12; B60W 40/06; G05D 1/0088; G05D 2201/0213; G06K 9/00798
USPC .......................................................... 701/23
See application file for complete search history.

(56) References Cited

U.S. PATENT DOCUMENTS

| | | | |
|---|---|---|---|
| 2003/0236606 A1* | 12/2003 | Lu | B62D 7/159 701/70 |
| 2011/0245995 A1* | 10/2011 | Schwarz | G06T 7/73 701/1 |
| 2016/0325753 A1* | 11/2016 | Stein | G06K 9/46 |
| 2017/0015312 A1* | 1/2017 | Latotzki | B62D 15/027 |
| 2017/0193338 A1* | 7/2017 | Huberman | G06K 9/00791 |
| 2017/0345295 A1* | 11/2017 | Mattar | G08G 1/04 |
| 2018/0031384 A1* | 2/2018 | Lee | G01C 21/3602 |
| 2018/0086351 A1* | 3/2018 | Zhu | G05D 1/0212 |

(Continued)

FOREIGN PATENT DOCUMENTS

| | | | |
|---|---|---|---|
| DE | 102010013178 A1 * | 12/2010 | B62D 5/0472 |
| WO | WO-2012172713 A1 * | 12/2012 | B60W 40/072 |

OTHER PUBLICATIONS

Huili et al. "Cooperative Path Planning for Target Tracking in Urban Environments Using Unmanned Air and Ground Vehicles," 2015, vol. 20, Publisher: IEEE.*

(Continued)

*Primary Examiner* — Tuan C To

(57) ABSTRACT

An automotive vehicle includes at least one actuator configured to control vehicle steering, at least one sensor configured to detect a profile of a driving surface proximate the vehicle, and at least one controller in communication with the actuator and the sensor. The controller is configured to identify a plurality of potential paths within a driveable lane, determine at least one road profile parameter for each respective potential path, identify a desired path based on a comparison of the respective road profile parameters for the plurality of potential paths, and control the actuator to steer the vehicle according to the desired path.

12 Claims, 4 Drawing Sheets

(56) References Cited

U.S. PATENT DOCUMENTS

| | | | | |
|---|---|---|---|---|
| 2019/0106108 A1* | 4/2019 | Wienecke | ............. | B60W 10/18 |
| 2019/0179328 A1* | 6/2019 | Movert | ............. | B60W 50/0097 |
| 2019/0375429 A1* | 12/2019 | Gardner | .............. | B60W 50/087 |
| 2020/0172100 A1* | 6/2020 | Kato | ....................... | G01C 21/26 |
| 2020/0218979 A1* | 7/2020 | Kwon | ....................... | G06N 3/08 |

OTHER PUBLICATIONS

Hailong et al., "Optimal Path Planning for a Vehicle Collecting Data in a Wireless Sensor Network," 2016, Publisher: IEEE.*

* cited by examiner ent of the present disclosure;
SYSTEM AND METHOD FOR AUTONOMOUS CONTROL OF A PATH OF A VEHICLE

INTRODUCTION

The present disclosure relates to vehicles controlled by automated driving systems, particularly those configured to automatically control vehicle steering, acceleration, and braking during a drive cycle without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes at least one actuator configured to control vehicle steering, at least one sensor configured to detect a profile of a driving surface proximate the vehicle, and at least one controller in communication with the actuator and the sensor. The controller is configured to identify a plurality of potential paths within a driveable lane, determine at least one road profile parameter for each respective potential path, identify a desired path based on a comparison of the respective road profile parameters for the plurality of potential paths, and control the actuator to steer the vehicle according to the desired path.

In an exemplary embodiment, the vehicle additionally includes a body having a driver side and a passenger side. The driveable lane is bounded by a driver-side lane boundary and a passenger-side lane boundary, and the plurality of potential paths are defined such that for each respective path, the driver side is within the driver-side lane boundary and the passenger side is within the passenger-side lane boundary.

In an exemplary embodiment, the controller is further configured to define a second plurality of potential paths within a second driveable lane which is adjacent the driveable lane. In such embodiments, the desired path is based on a comparison of the road profile parameters for the plurality of potential paths and of respective road profile parameters for the second plurality of potential paths.

In an exemplary embodiment, the at least one road profile parameter includes a first weighted factor based on a lateral road profile of the respective path, a second weighted factor based on a vertical road profile of the respective path, and a third weighted factor based on a coefficient of road friction of the respective path. In such embodiments, respective weights of the first weighted factor, the second weighted factor, and the third weighted factor may be determined based on an operator preference input.

In an exemplary embodiment, the at least one road profile parameter includes a weighted factor based on one or more identified obstructions on the respective path.

A method of controlling an automotive vehicle according to the present disclosure includes providing the vehicle with at least one actuator configured to control vehicle steering, at least one sensor configured to detect a profile of a driving surface proximate the vehicle, and at least one controller in communication with the at least one actuator and the at least one sensor. The method additionally includes identifying, via the controller, a plurality of potential paths within a driveable lane. The method also includes determining, via the controller, at least one road profile parameter for each respective potential path. The method further includes identifying a desired path, via the controller, based on a comparison of the respective road profile parameters for the plurality of potential paths. The method still further includes automatically controlling the actuator, via the controller, to steer the vehicle according to the desired path.

In an exemplary embodiment, the driveable lane is bounded by a driver-side land boundary and a passenger-side lane boundary, and the plurality of potential paths is defined such that for each respective path, the vehicle is positioned between the driver-side lane boundary and the passenger-side lane boundary.

In an exemplary embodiment, the method additionally includes identifying, via the controller, a second plurality of potential paths within a second driveable lane. The second driveable lane is adjacent the driveable lane. In such embodiments, the desired path is based on a comparison of the respective road profile parameters for the plurality of potential paths and of respective road profile parameters for the second plurality of potential paths.

In an exemplary embodiment, the at least one road profile parameter comprises a first weighted factor based on a lateral road profile of the respective path, a second weighted factor based on a vertical road profile of the respective path, and a third weighted factor based on a coefficient of road friction of the respective path. In such embodiments, respective weights of the first weighted factor, the second weighted factor, and the third weighted factor may be determined based on an operator preference input.

In an exemplary embodiment, the at least one road profile parameter includes a weighted factor based on one or more identified obstructions on the respective path.

Embodiments according to the present disclosure provide a number of advantages. For example, the present disclosure provides a system and method for autonomously controlling a vehicle according to different paths within a single lane based on a road profile and on user preferences, and thereby increase occupant satisfaction.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
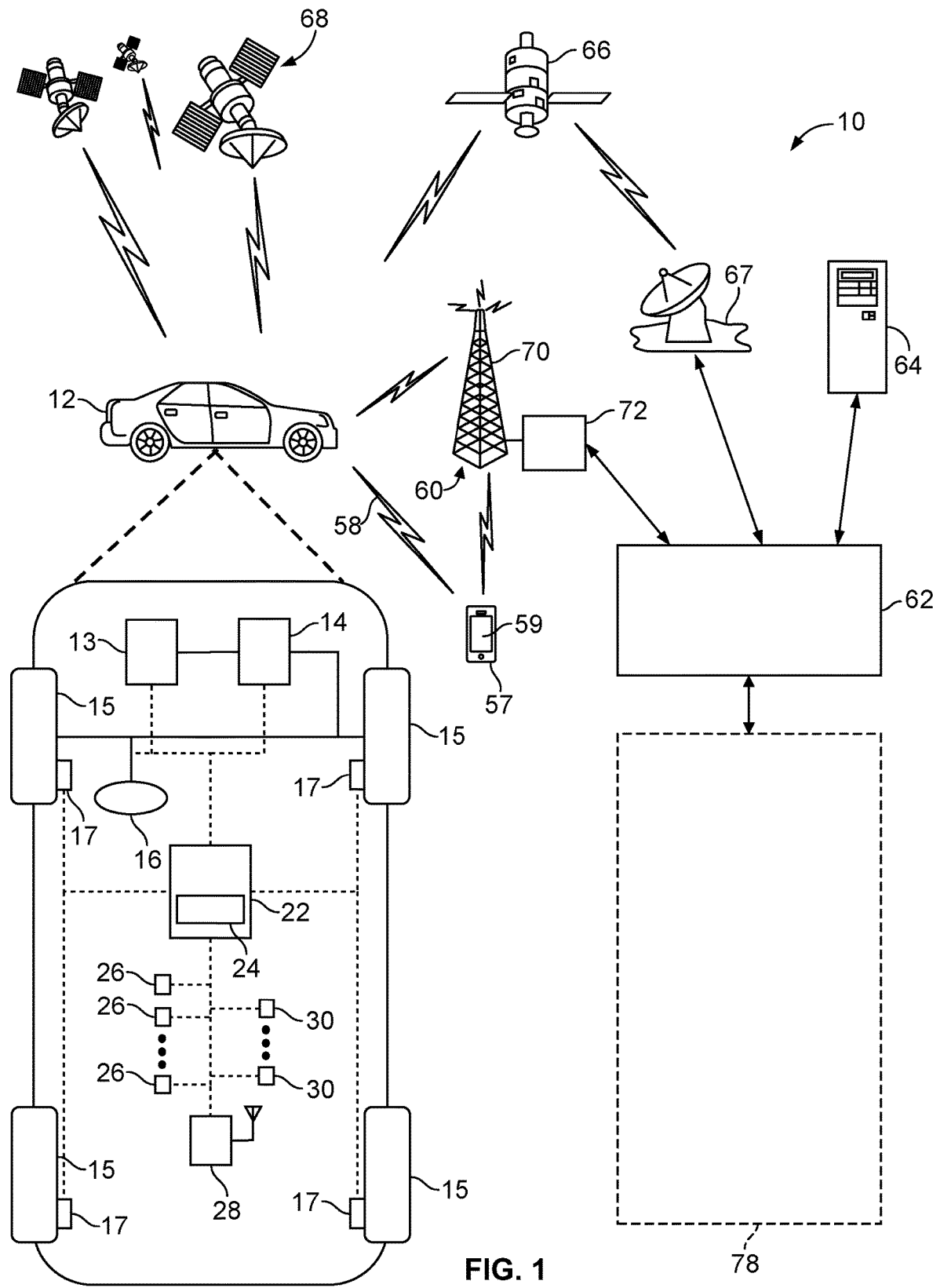
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human driver will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human driver perform all remaining aspects of the dynamic driving task. A Level Two system indicates "Partial Automation", referring to the driving mode-specific execution by one or more driver assistance systems of both steering and acceleration using information about the driving environment and with the expectation that the human driver perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
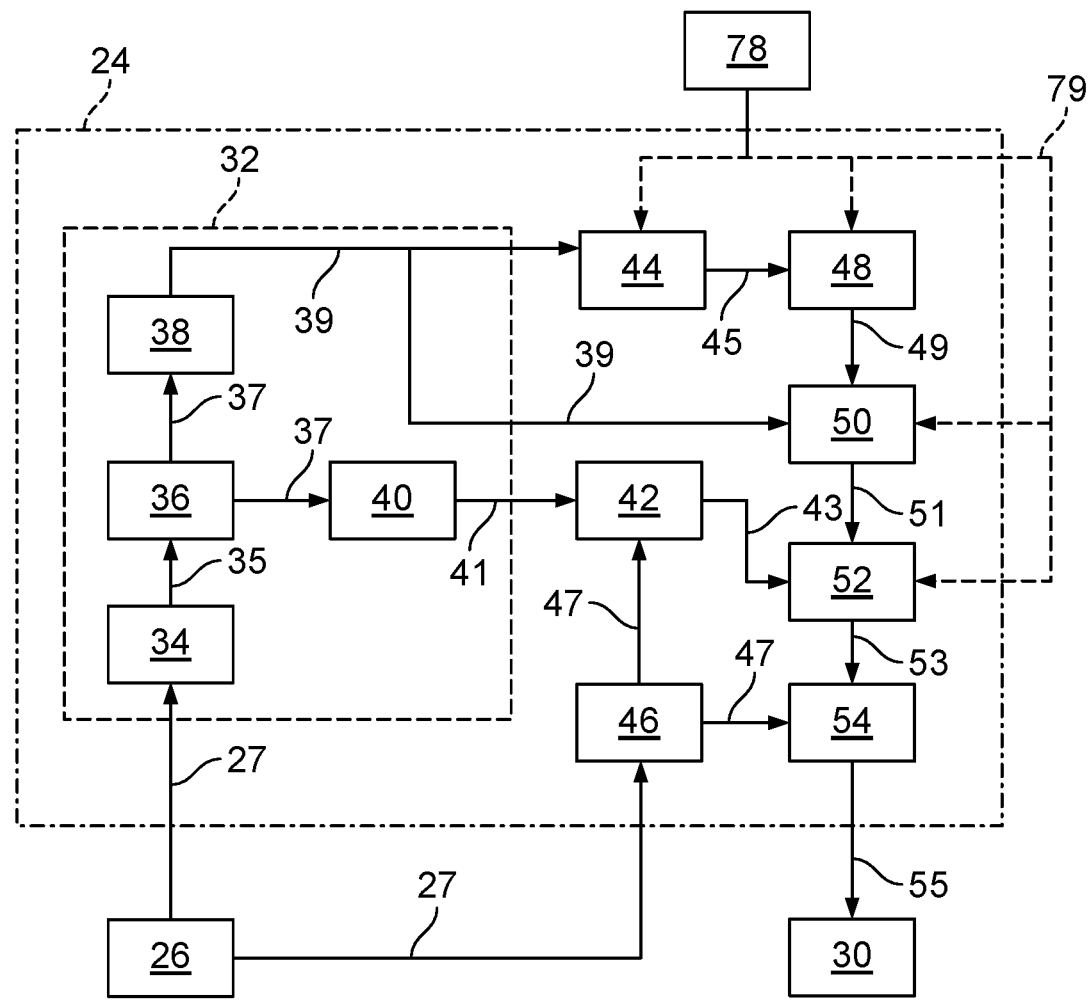
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Known algorithms are generally configured to maintain a predefined position relative to the current driving lane, e.g. at a midpoint between lane markings. However, on some driving surfaces it may be desirable to maintain the vehicle at different positions relative to the lane. Examples of such driving surface include those where the road crown is off-center, where the road has ruts, where the road has a series of potholes, or where the road has train or trolley tracks running threrethrough.

Figure 3:
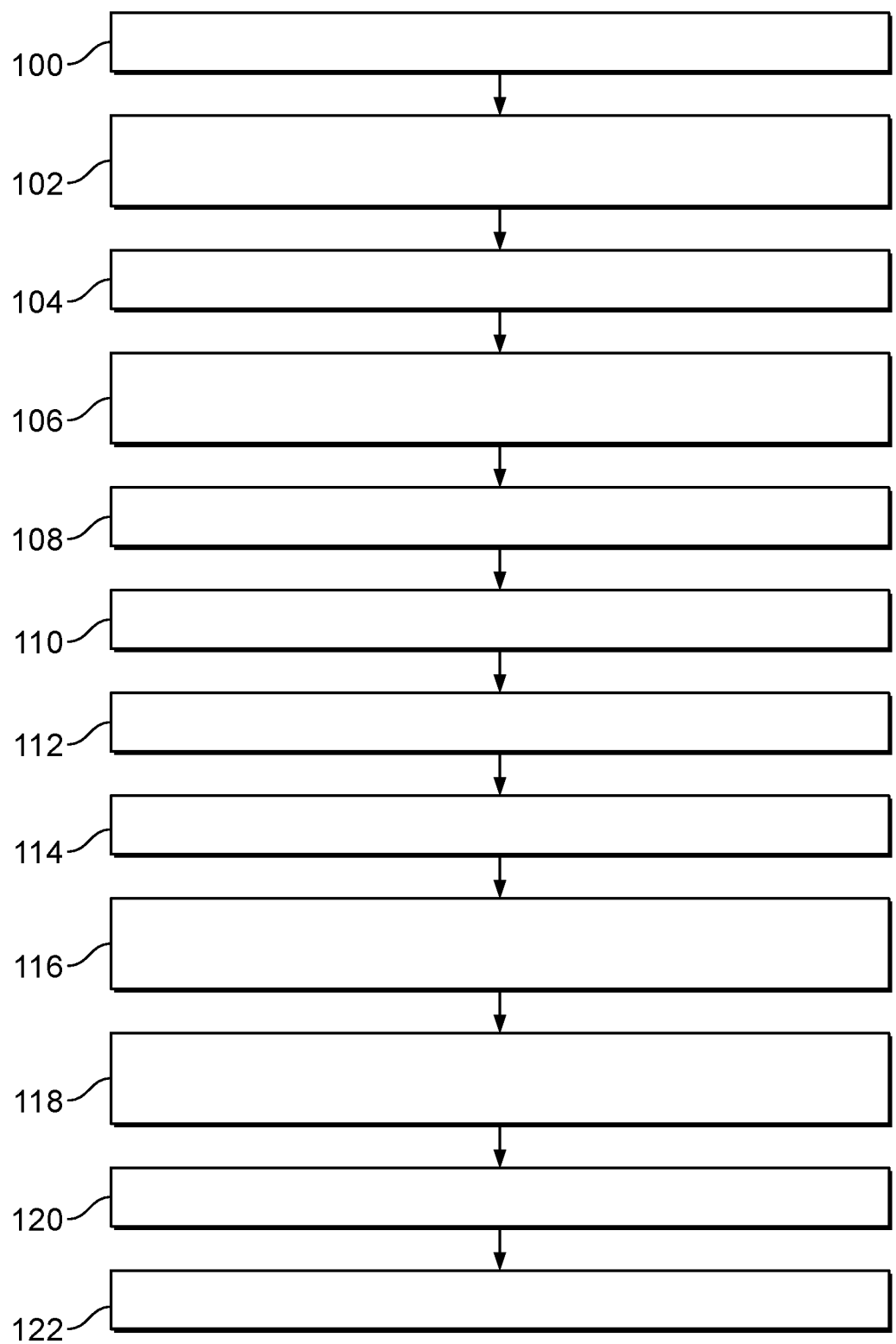
FIG. 3 is a flowchart representation of a method of controlling a vehicle according to an embodiment of the present disclosure.

Referring now to FIG. 3, a method of controlling a vehicle according to the present disclosure is illustrated in flowchart form. In an exemplary embodiment, the algorithm is performed by the controller 22 as a portion of the ADS 24, e.g. the path planning module 50 in conjunction with additional modules as appropriate.

Host vehicle parameters are obtained, as illustrated at block 100. The host vehicle parameters refer to vehicle-configuration-specific values which may be stored in non-transient data memory in communication with the controller 22. The host vehicle parameters include, but are not limited to, vehicle width, wheelbase, and tire width.

In an optional step, user preferences are received, as illustrated at block 102. In an exemplary embodiment, the user preference is received via a user input to a human-machine interface (HMI) in communication with the controller 22. The user preference may indicate the user's desired driving position within a lane, e.g. dead-center or proximate a driver-side or passenger-side lane marking. The user may also indicate a user's tolerance for various maneuver types, e.g. a preference for the smoothest ride or a preference for a sportier feel.

For each driveable lane on a current road segment, lane data are obtained, as illustrated at block 104. The lane data include, but are not limited to, lane width and curvature for the lane. Driveable lanes refer to a current vehicle lane and any adjacent lanes which permit traffic flow in the same direction as the current vehicle lane.

Figure 4A:
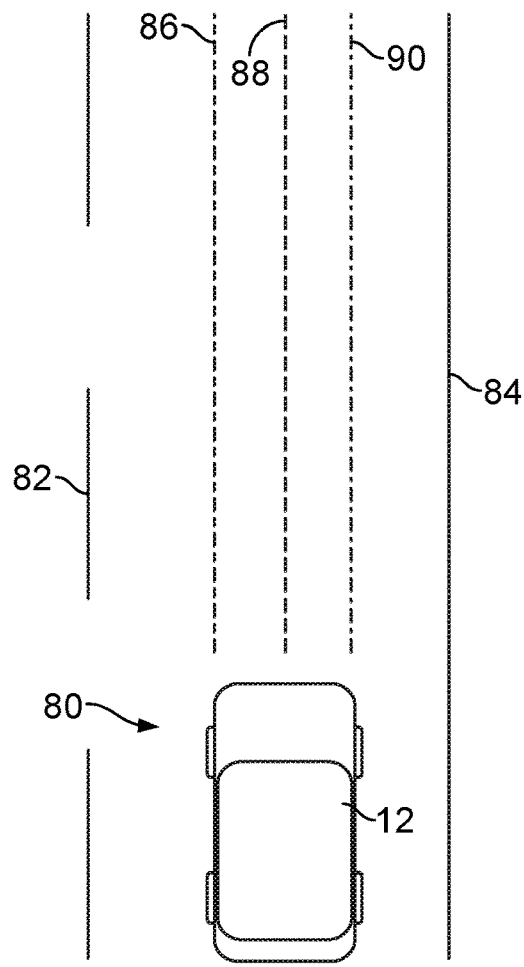
FIGS. 4A-4B are illustration of a vehicle being controlled according to an embodiment of the present disclosure.
Figure 4B:
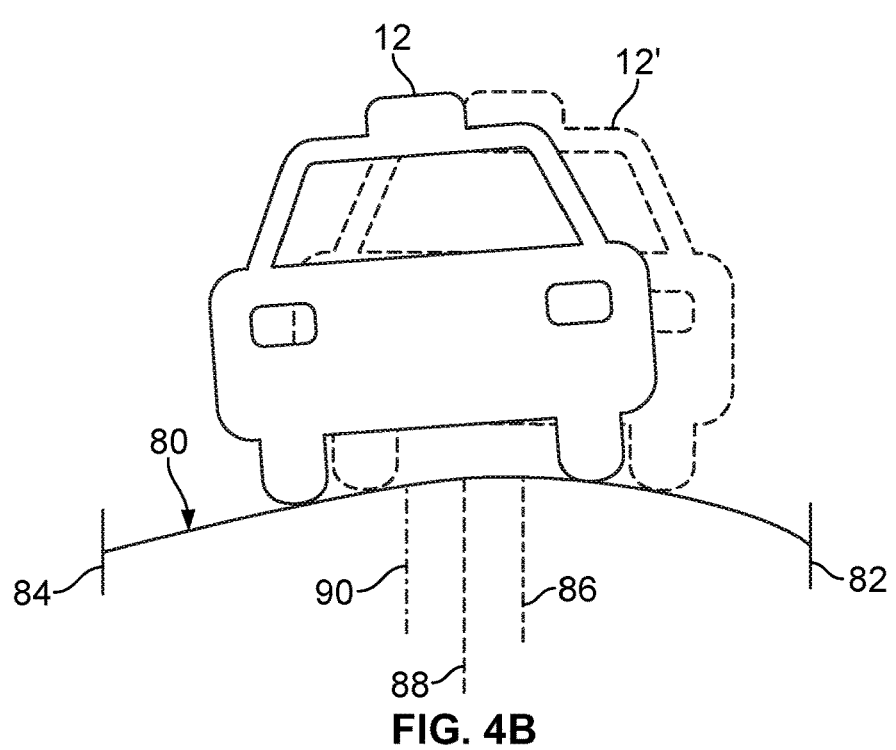

One or more potential paths within the driveable lane(s) are defined, as illustrated at block 106. The paths are defined based on the lane data and the host vehicle parameters. In the exemplary embodiment of FIGS. 4A and 4B, the vehicle 12 is positioned within a lane 80 bounded by a driver-side lane edge 82 and a passenger-side lane edge 84. A first path 86, second path 88, and third path 90 are defined within the lane 80. The first path 86 is defined such that when the centerline of the vehicle 12 is above the first path 86, the vehicle 12 does not extend past the driver-side lane edge 82. The second path 88 is defined based on the midpoint between the driver-side lane edge 82 and the passenger-side lane edge 84. The third path 90 is defined such that when the centerline of the vehicle 12 is above the third path 90, the vehicle 12 does not extend past the passenger-side lane edge 84. In various embodiments, a greater or smaller number of paths may be defined within each driveable lane.

For each path, a lateral road profile is obtained, as illustrated at block 108. The lateral road profile refers to the shape of the driving surface along the respective path in a lateral direction, i.e. parallel to a side-side axis of the vehicle 12. In a first exemplary embodiment, the lateral road profile is calculated in real time by the controller 22 based on signals from one or more of the sensors 26. In a second exemplary embodiment, the lateral road profile is obtained from topographical map data stored in non-transient data storage in communication with the controller 22.

For each path, a vertical road profile is obtained, as illustrated at block 110. The vertical road profile refers to the shape of the driving surface along the respective path in a vertical direction, i.e. parallel to an up-down axis of the vehicle 12. In a first exemplary embodiment, the vertical road profile is calculated in real time by the controller 22 based on signals from one or more of the sensors 26. In a second exemplary embodiment, the vertical road profile is obtained from topographical map data stored in non-transient data storage in communication with the controller 22.

For each path, a coefficient of road friction is estimated, as illustrated at block 112. In an exemplary embodiment, the coefficient of road friction is estimated based on signals from one or more of the sensors 26, e.g. an optical camera indicating the presence of snow, rain, or ice on the respective path. However, in other embodiments any appropriate technique for estimating road friction may be used.

Adjustments may then be applied based on traffic density and/or the presence of barriers, as illustrated at block 114. In an exemplary embodiment, signals from one or more of the sensors 26 may be evaluated to determine if there is a vehicle or barrier in an adjacent lane, in response to which paths in the adjacent lane may be discarded from consideration or given a lower weighting.

For each respective path, a lateral factor is calculated based on the lateral road profile, a vertical factor is calculated based on the vertical road profile, and a friction factor is calculated based on the coefficient of friction, as illustrated in block 116. In an exemplary embodiment, the lateral factor is calculated using a model based on historical data, cloud data, crowd-sourced data, live sensor data, or any combination thereof, to integrate the lateral road profile into a parameter representing an expected lateral acceleration and displacement on the vehicle on the respective path. Likewise, the vertical factor may be calculated using a model based on historical data, cloud data, crowd-sourced data, live sensor data, or any combination thereof, to integrate the vertical road profile into a parameter representing an expected vertical acceleration and displacement on the vehicle on the respective path. Furthermore, the friction factor may be calculated using a model based on historical data, cloud data, crowd-sourced data, live sensor data, or any combination thereof, to integrate the calculated coefficient of friction into a parameter representing road friction on the respective path.

For each driveable lane, a best path is selected based on the lateral factor, vertical factor, friction factor, and user preference, as illustrated at block 118. In an exemplary embodiment, the lateral factor is weighted according to a first weight factor, the vertical factor is weighted according to a second weight factor, and the third lateral factor is weighted according to a third weight factor. In such embodiments, the weight factors may be provided by the manufacturer, determined based on the user preference, or a combination thereof. In an exemplary embodiment, the best path is selected by minimizing a cost function applied to each path within the driveable lane; however, other methods for selecting a path may be used as appropriate.

The desired lane and path are selected based on a comparison of the best path in each lane, as illustrated at block 120. In embodiments where the best paths are selected based on a cost function, the respective costs of the paths may be compared to select an overall best path and corresponding lane. However, other methods for selecting the desired lane and path may be used as appropriate. In an exemplary embodiment, the desired lane and path may be output as part of the path planning output 51.

The vehicle is automatically controlled according to the selected lane and path, as illustrated at block 120. In an exemplary embodiment, this is performed via the controller 22 controlling the actuators 30 according via the ADS 24, e.g. the first control module 52 and vehicle control module 54. In the exemplary illustration of FIG. 4B, the lane 80 comprises a driving surface with an off-center crown, and the vehicle 12 may thereby be controlled according to the first path 86, resulting in a more upright and comfortable orientation 12'. Moreover, control according to the first path 86 may result in a smoother ride because the ADS would not be required to correct for a vehicle tendency to veer down the slope.

As may be seen the present disclosure provides a system and method for autonomously controlling a vehicle according to different paths within a single lane based on a road profile and on user preferences, thereby increasing occupant satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   at least one actuator configured to control vehicle steering;
   at least one sensor configured to detect a profile of a driving surface proximate the vehicle; and
   at least one controller in communication with the at least one actuator and the at least one sensor, the at least one controller being configured to identify a plurality of potential paths within a driveable lane, determine at least one road profile parameter for each respective potential path, identify a desired path based on a comparison of the respective road profile parameters for the plurality of potential paths, and control the actuator to steer the vehicle according to the desired path.

2. The automotive vehicle of claim 1, further comprising a body having a driver side and a passenger side, wherein the driveable lane is bounded by a driver-side lane boundary and a passenger-side lane boundary, and wherein the plurality of potential paths is defined such that for each respective path, the driver side is within the driver-side lane boundary and the passenger side is within the passenger-side lane boundary.

3. The automotive vehicle of claim 1, wherein the at least one controller is further configured to define a second plurality of potential paths within a second driveable lane, the second driveable lane being adjacent the driveable lane, and wherein the desired path is based on a comparison of the respective road profile parameters for the plurality of potential paths and of respective road profile parameters for the second plurality of potential paths.

4. The automotive vehicle of claim 1, wherein the at least one road profile parameter comprises a first weighted factor based on a lateral road profile of the respective potential path, a second weighted factor based on a vertical road profile of the respective potential path, and a third weighted factor based on a coefficient of road friction of the respective potential path.

5. The automotive vehicle of claim 4, wherein respective weights of the first weighted factor, the second weighted factor, and the third weighted factor are determined based on an operator preference input.

6. The automotive vehicle of claim 1, wherein the at least one road profile parameter comprises a weighted factor based on one or more identified obstructions on the respective potential path.

7. A method of controlling an automotive vehicle, comprising:
   providing the vehicle with at least one actuator configured to control vehicle steering, at least one sensor configured to detect a profile of a driving surface proximate the vehicle, and at least one controller in communication with the at least one actuator and the at least one sensor;
   identifying, via the controller, a plurality of potential paths within a driveable lane;
   determining, via the controller, at least one road profile parameter for each respective potential path;
   identifying a desired path, via the controller, based on a comparison of the respective road profile parameters for the plurality of potential paths; and
   automatically controlling the actuator, via the controller, to steer the vehicle according to the desired path.

8. The method of claim 7, wherein the driveable lane is bounded by a driver-side lane boundary and a passenger-side lane boundary, and wherein the plurality of potential paths is defined such that for each respective path, the vehicle is positioned between the driver-side lane boundary and the passenger-side lane boundary.

9. The method of claim 7, further comprising identifying, via the controller, a second plurality of potential paths within a second driveable lane, the second driveable lane being adjacent the driveable lane, wherein the desired path is based on a comparison of the respective road profile parameters for the plurality of potential paths and of respective road profile parameters for the second plurality of potential paths.

10. The method of claim 7, wherein the at least one road profile parameter comprises a first weighted factor based on a lateral road profile of the respective potential path, a second weighted factor based on a vertical road profile of the respective potential path, and a third weighted factor based on a coefficient of road friction of the respective potential path.

11. The method of claim 10, wherein respective weights of the first weighted factor, the second weighted factor, and the third weighted factor are determined based on an operator preference input.

12. The method of claim 7, wherein the at least one road profile parameter comprises a weighted factor based on one or more identified obstructions on the respective potential path.

* * * * *